US009912281B2

(12) United States Patent
Hirayama et al.

(10) Patent No.: US 9,912,281 B2
(45) Date of Patent: Mar. 6, 2018

(54) MOTOR DRIVING APPARATUS INCLUDING OVERCURRENT DETECTION UNIT

(71) Applicant: FANUC CORPORATION, Yamanashi (JP)

(72) Inventors: Nobuo Hirayama, Yamanashi (JP); Taku Sasaki, Yamanashi (JP); Kiichi Inaba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/246,657

(22) Filed: Aug. 25, 2016

(65) Prior Publication Data

US 2017/0063283 A1     Mar. 2, 2017

(30) Foreign Application Priority Data

Sep. 2, 2015   (JP) ................................. 2015-172974

(51) Int. Cl.
    *H02P 7/00*          (2016.01)
    *H02P 29/40*        (2016.01)
    (Continued)

(52) U.S. Cl.
    CPC .............. *H02P 29/40* (2016.02); *H02P 27/06* (2013.01); *H02P 27/08* (2013.01); *H02P 29/027* (2013.01)

(58) Field of Classification Search
    CPC ...... H02M 7/537; H02M 3/158; H02M 1/084; H02P 27/06; H02P 29/02; H02P 29/40; H02P 27/04; H02P 6/28
    (Continued)

(56) References Cited

U.S. PATENT DOCUMENTS 3,719,873 A *   3/1973   Graf ..................... H02H 7/0833
                                                                 318/476
5,123,746 A *   6/1992   Okado ................ H02M 7/5387
                                                                  363/37

(Continued)

FOREIGN PATENT DOCUMENTS

JP           3692740 B      9/2005
JP      2013123340 A      6/2013

(Continued)

OTHER PUBLICATIONS

Untranslated Notification of Reasons for Refusal mailed by Japan Patent Office (JPO) for Application No. JP 2015-172974, dated Dec. 20, 2016, 4 pages.

(Continued)

*Primary Examiner* — Bentsu Ro
*Assistant Examiner* — Thai Dinh
(74) *Attorney, Agent, or Firm* — Fredrikson & Byron, P.A.

(57) ABSTRACT

A motor driving apparatus includes a motor driving unit for converting DC voltage on a DC link into AC voltage when a switching device is turned on/off and outputting the AC voltage to an AC motor side, a gate driving circuit for turning on/off the switching device, a gate driving command generation unit for outputting either one of an ON command and an OFF command to the gate driving circuit, and an overcurrent detection unit for detecting an overcurrent with respect to a DC link current or an alternating current on the AC motor side, wherein, when the overcurrent detection unit detects the overcurrent, the gate driving command generation unit alternately outputs the ON command and the OFF command while gradually increasing a ratio of the OFF command to the ON command and ultimately outputs only the OFF command.

3 Claims, 5 Drawing Sheets

(51) Int. Cl.
*H02P 27/06* (2006.01)
*H02P 27/08* (2006.01)
*H02P 29/024* (2016.01)

(58) Field of Classification Search
USPC .......................... 318/474, 400.22, 722, 434
See application file for complete search history.

(56) References Cited

U.S. PATENT DOCUMENTS

| | | | | |
|---|---|---|---|---|
| 5,218,523 | A * | 6/1993 | Sugishima | H02M 7/538 327/390 |
| 5,687,049 | A * | 11/1997 | Mangtani | H02M 1/32 361/18 |
| 7,622,873 | B2 * | 11/2009 | Takata | H02P 6/182 318/362 |
| 2004/0136135 | A1 | 7/2004 | Takahashi | |
| 2008/0261092 | A1 * | 10/2008 | Bono | F16K 31/0675 429/415 |
| 2010/0091530 | A1 * | 4/2010 | Yoshida | H02M 1/36 363/49 |
| 2014/0055066 | A1 * | 2/2014 | Harada | H02P 6/20 318/400.27 |
| 2014/0092655 | A1 | 4/2014 | Igarashi et al. | |

FOREIGN PATENT DOCUMENTS

| | | |
|---|---|---|
| JP | 201475694 A | 4/2014 |
| WO | 2011121765 A1 | 10/2011 |
| WO | 2012077187 A1 | 6/2012 |

OTHER PUBLICATIONS

English machine translation of Decision to Grant a Patent mailed by JPO for Application No. JP 2015-172974, dated Dec. 20, 2016, 3 pages.
Untranslated Decision to Grant a Patent mailed by Japan Patent Office (JPO) for Application No. JP 2015-172974, dated Feb. 28, 2017, 3 pages.
English machine translation of Decision to Grant a Patent mailed by JPO for Application No. JP 2015-172974, dated Feb. 28, 2017, 3 pages.
English Abstract for Japanese Publication No. 3692740 B2, published Sep. 7, 2005, 2 pgs.
English Abstract and Machine Translation for Japanese Publication No. 2014-075694 A, published Apr. 24, 2014, 42 pgs.
English Abstract and Machine Translation for Japanese Publication No. 2013-123340 A, published Jun. 20, 2013, 19 pgs.

* cited by examiner

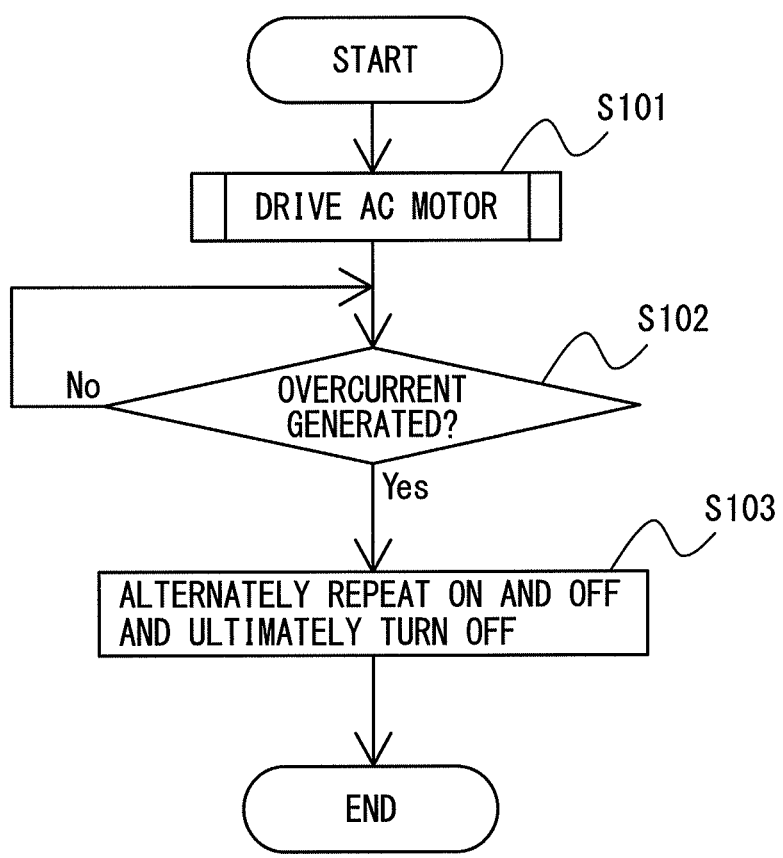

MOTOR DRIVING APPARATUS INCLUDING OVERCURRENT DETECTION UNIT

BACKGROUND OF THE INVENTION

1. Field of the Invention

The present invention relates to a motor driving apparatus for driving a feed axis and a main axis of a machine tool or arms and the like of an industrial machine and an industrial robot.

2. Description of the Related Art

A motor driving apparatus for driving an alternating-current (AC) motor as a driving source of a feed axis and a main axis of a machine tool or arms and the like of an industrial machine and an industrial robot once converts an AC voltage input from an AC power source side into a direct-current (DC) voltage, further converts into the AC voltage, and then supplies the alternating current to the AC motor. Thus, the motor driving apparatus includes a rectifier which rectifies the AC voltage supplied from the AC power source side and outputs the DC voltage to a DC link (a direct-current link) and an inverter which is connected to the DC link on the AC side of the rectifier and converts the DC voltage of the DC link side into the AC voltage by a switching operation of an internal switching device and supplies the alternating current to the AC motor.

FIG. 5 is a circuit diagram illustrating a general motor driving apparatus which drives a three-phase AC motor using a DC power source. A motor driving apparatus 100 for driving a three-phase AC motor (hereinafter, simply referred to as an "AC motor") 200 is provided with an inverter 50, and the inverter 50 is applied with a DC voltage from the DC power source is applied to the DC link side of the inverter 50, which outputs a three-phase alternating current for driving the motor 200. Although not illustrated, a rectifier which converts an alternating current input from a commercial AC power source into a direct current and outputs the direct current is generally provided on its DC link side of the inverter 50.

The motor driving apparatus 100 includes the inverter 50, a gate driving circuit 61, a gate driving command generation unit 62, an overcurrent detection unit 63, and a current command generation unit 64. The inverter 50 is constituted of a switching device S and a bridge circuit of a switch unit including a diode D which is connected in reversely parallel to the switching device S, and when the switching device S is turned in/off, the inverter 50 converts the DC voltage on the DC link side into the AC voltage and outputs the AC voltage to the AC motor 200 side. A motor control unit 60 is constituted of the gate driving command generation unit 62, the overcurrent detection unit 63, and the current command generation unit 64. The current command generation unit 64 generates a current command based on an alternating current flowing into the AC motor 200 detected by a motor current detector 71. The gate driving command generation unit 62 outputs either one of an ON command and an OFF command as a gate driving command to the gate driving circuit 61. The gate driving circuit 61 turns on/off on the switching device S of a motor driving unit in response to the received gate driving command. Note that, for simplifying the drawing, only one phase of the gate driving circuit 61 is illustrated. The overcurrent detection unit 63 detects generation of an overcurrent with respect to a current flowing through a DC link detected by a DC link current detector 72 or the alternating current on the AC motor 200 side detected by the motor current detector 71.

As illustrated in FIG. 5, when an abnormal short circuit occurs between output phases on the AC motor 200 side of the motor driving apparatus 100, an overcurrent flowing through a path illustrated in a bold-faced arrow is generated. When the overcurrent continuously flows, each device such as the switching device S breaks down, so that it is needed to interrupt the overcurrent to protect each device. Thus, when the overcurrent detection unit 63 detects the generation of the overcurrent, the gate driving command generation unit 62 generates the OFF command for turning off the switching device S for the gate driving circuit 61, and in response to the command, the gate driving circuit 61 immediately turns off the switching device S and interrupts the overcurrent.

However, since a very large overcurrent is quickly interrupted, a temporal change of the current is large, and a surge voltage caused by an inductance of a current path becomes very large which may be a cause of failure of each device such as the switching device S.

Thus, a snubber circuit 81 for absorbing a surge as illustrated in FIG. 5 is often provided to suppress the surge voltage generated at the time of the overcurrent interruption. In FIG. 5, only one phase of the snubber circuit 81 is illustrated for simplifying the drawing, In addition to the above, as a method for suppressing the surge voltage generated at the time of the overcurrent interruption, for example, there is a method for reducing a switching speed of the switching device by increasing a gate resistance of the switching device and gently interrupting a current.

As a method for differentiating a switching speed at the time of the overcurrent and that of a normal time, for example, two types of gate resistances, i.e., gate resistances having a large resistance value and having a small one are prepared for the switching device, and the small gate resistance is used in the normal time so as not to reduce the switching speed, and the large gate resistance is used at the time of the overcurrent to reduce the switching speed.

Further, for example, as described in Japanese Patent No. 3692740, there is a method for suppressing a surge voltage by generating a gate voltage pattern including two patterns, i.e., a part in which a gate voltage change is gentle so as to reduce the surge voltage and a part in which the gate voltage change is sharp so as not to increase a switching loss using a gate voltage pattern generator in the normal switching.

As described above, suppression of the surge voltage generated at the time of the overcurrent interruption is important to prevent failure of each device such as the switching device S.

Regarding the method using the snubber circuit in the methods for suppressing the surge voltage generated at the time of the overcurrent interruption, the size of components constituting the snubber circuit will be larger as the surge voltage to be suppressed becomes larger, so that there is a problem that an excessive snubber circuit has to be installed in the normal time other than the time of the overcurrent interruption, and that a cost is increased.

The method for reducing the switching speed of the switching device by increasing the gate resistance has a problem of inefficiency because the switching loss is increased in the normal time in which a faster switching speed causes no problem.

The method for using a plurality of gate resistances having different resistance values has a problem that components of the circuits are increased which increase the cost and deteriorate reliability.

According to the invention described in Japanese Patent No. 3692740, a gate voltage pattern including a part in which the switching speed is faster and a part in which the switching speed is slower has to be generated in one turn-off operation, and there are problems that control is complicated, and components of the circuits will be increased.

SUMMARY OF INVENTION

In view of the above-described problems, an object of the present invention is to provide a highly reliable motor driving apparatus in high efficiency and low cost which can easily suppress a surge voltage generated at the time of overcurrent interruption without increasing a switching loss in a normal time and components of a circuit.

In order to realize the above-described object, a motor driving apparatus for converting a DC voltage into an AC voltage by a switching operation of a switching device and supplying an alternating current to an AC motor includes a motor driving unit configured to convert a DC voltage on a DC link side into an AC voltage when an internal switching device is turned on/off, and output the AC voltage to an AC motor side, a gate driving circuit configured to turn on/off the switching device of the motor driving unit in response to a received gate driving command, a gate driving command generation unit configured to output either one of an ON command and an OFF command as the gate driving command to the gate driving circuit, and an overcurrent detection unit configured to detect generation of an overcurrent with respect to a current flowing through a DC link of the motor driving unit or an alternating current on the AC motor side, wherein, when the overcurrent detection unit detects the generation of the overcurrent, the gate driving command generation unit alternately outputs the ON command and the OFF command while gradually increasing a ratio of the OFF command to the ON command and ultimately outputs only the OFF command.

The motor driving apparatus may include a DC link current detector configured to detect a current flowing through the DC link, wherein the overcurrent detection unit may monitor the current detected by the DC link current detector and, when detecting generation of an overcurrent, notify the gate driving command generation unit of the generation of the overcurrent.

Further, the motor driving apparatus may include a motor current detector configured to detect an alternating current on the AC motor side, wherein the overcurrent detection unit may monitor the alternating current detected by the motor current detector and, when detecting generation of an overcurrent, notify the gate driving command generation unit of the generation of the overcurrent.

BRIEF DESCRIPTION OF THE DRAWINGS

The present invention will be more clearly understood by referring to the following accompanying drawings:

FIG. 4 is a flowchart illustrating an operation flow of the motor driving apparatus according to the embodiment.

DETAILED DESCRIPTION

A motor driving apparatus including an overcurrent detection unit will be described below with reference to the drawings. However, it should be understood that the present invention is not limited to the drawings or embodiments described below.

Figure 1:
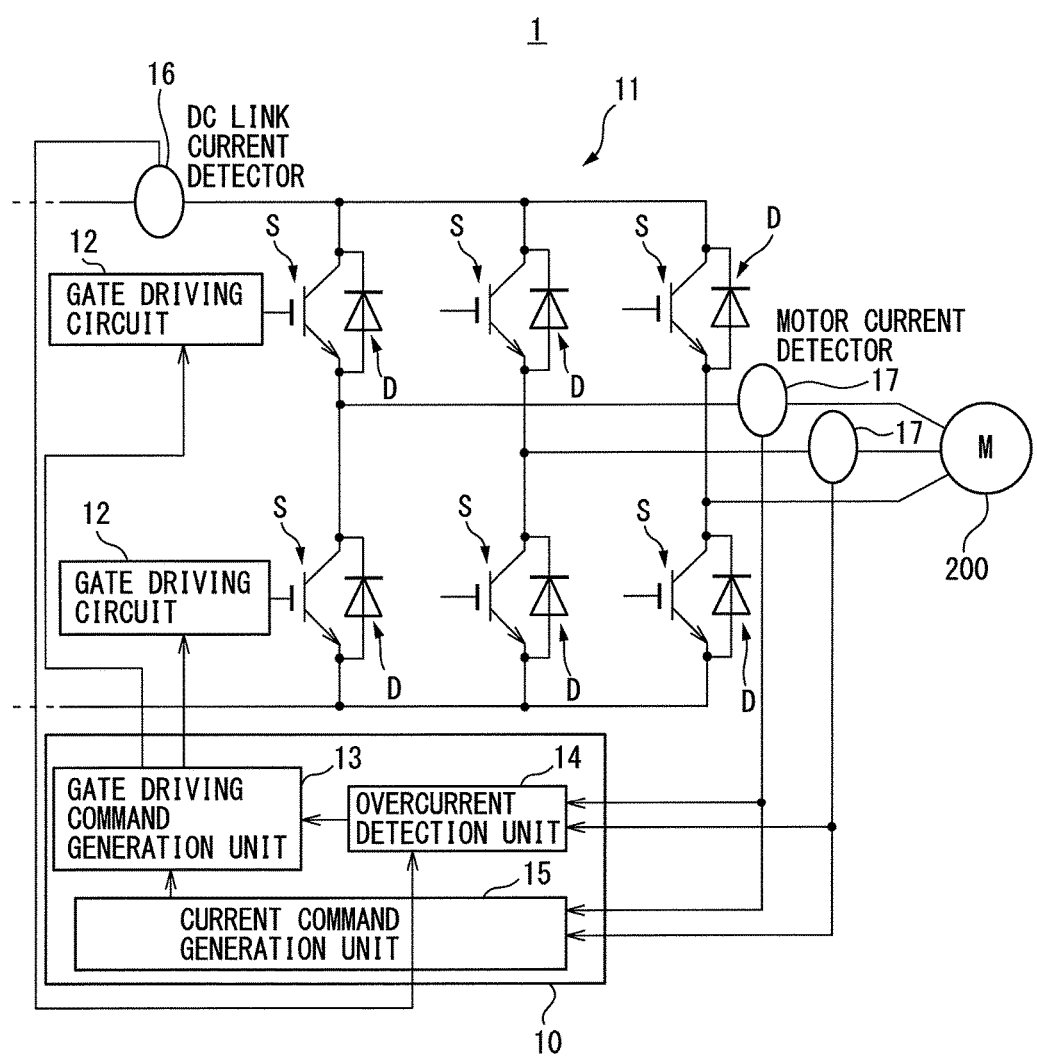
FIG. 1 is a circuit diagram illustrating a motor driving apparatus according to an embodiment.

FIG. 1 is a circuit diagram illustrating the motor driving apparatus according to the embodiment. A motor driving apparatus 1 according to the embodiment converts an input DC voltage into an AC voltage by a switching operation of a switching device S and supplies the AC voltage to an AC motor 200. The AC motor 200 is used as a driving source of, for example, a feed axis and a main axis of a machine tool or arms and the like of an industrial machine and an industrial robot. It is not especially illustrated here, the motor driving apparatus 1 may be provided with a converter for converting an alternating current input from a commercial AC power source into a direct current and outputting the direct current and/or a DC power source such as a battery on its DC link side. In the embodiment described here, the motor driving apparatus 1 for driving and controlling one AC motor 200 is described, however, the present invention in not especially limited by the number of motors to be driven and controlled and can be applied to a motor driving apparatus which drives and controls a plurality of motors. Further, a type of the AC motor driven by the motor driving apparatus 1 does not especially limit the present invention and may be, for example, an induction motor or a synchronous motor.

The motor driving apparatus 1 according to the embodiment includes a motor driving unit 11, a gate driving circuit 12, a gate driving command generation unit 13, and an overcurrent detection unit 14. The motor driving apparatus 1 further includes a current command generation unit 15, a DC link current detector 16, and a motor current detector 17 similar to a general motor driving apparatus. A motor control unit 10 is constituted of the gate driving command generation unit 13, the overcurrent detection unit 14, and the current command generation unit 15.

The motor driving unit 11 is an inverter constituted of the switching device S and a bridge circuit of a switch unit including a diode D which is connected reversely parallel to the switching device S, and when the switching device S is turned on/off, the motor driving unit 11 converts the DC voltage on the DC link side into the AC voltage and outputs the AC voltage to the AC motor 200 side. As examples of the switching device S, there are an IGBT, a MOSFET (Metal-Oxide-Semiconductor Field-Effect Transistor), a thyristor, a GTO (Gate Turn-Off Thyristor), and the like, however, a type itself of the switching device S does not limit the present invention, and other switching devices may be used.

The gate driving circuit 12 outputs a voltage to each switching device S for turning on/off the switching device S of the motor driving unit 11 in response to a gate driving command received from the gate driving command generation unit 13 described below. Note that only one phase of the gate driving circuit 12 is illustrated for simplifying the drawing, however, the gate driving circuit 12 is respectively provided to each of the switching devices S in the motor driving unit 11.

The gate driving command generation unit 13 outputs either one of an ON command and an OFF command as the gate driving command to the gate driving circuit 12. The gate driving command generation unit 13 outputs the gate driving command corresponding to a current command generated by the current command generation unit 15 in the normal time, and when an overcurrent is generated, the gate driving command generation unit 13 alternately outputs the ON command and the OFF command while gradually increasing a ratio of the OFF command to the ON command and ultimately outputs only the OFF command.

The overcurrent detection unit 14 detects generation of an overcurrent with respect to a current flowing through the DC link of the motor driving unit 11 or the alternating current on the AC motor 200 side. An overcurrent detection method itself does not limit the present invention, and a known method may be used. An overcurrent detection level may be appropriately set according to components constituting the motor driving apparatus 1, a use environment, and the like.

The DC link current detector 16 detects the current flowing through the DC link. The above-described overcurrent detection unit 14 monitors the current detected by the DC link current detector 16 and notifies the gate driving command generation unit 13 of generation of the overcurrent when detecting the generation of the overcurrent.

The motor current detector 17 detects the alternating current on the AC motor 200 side. The above-described overcurrent detection unit 14 monitors the alternating current detected by the motor current detector 17 and notifies the gate driving command generation unit 13 of generation of the overcurrent when detecting the generation of the overcurrent.

The current command generation unit 15 generates the current command in the normal time (i.e., not when the overcurrent is generated) based on the alternating current on the AC motor 200 side detected by the motor current detector 17. More specifically, the current command generation unit 15 generates the current command for controlling a speed, torque, or a position of a rotor of the AC motor 200 using a detection value of the motor current detector 17, an input speed command, an operation program of the AC motor 200, a rotational speed of the AC motor 200, and the like.

Figure 2A:
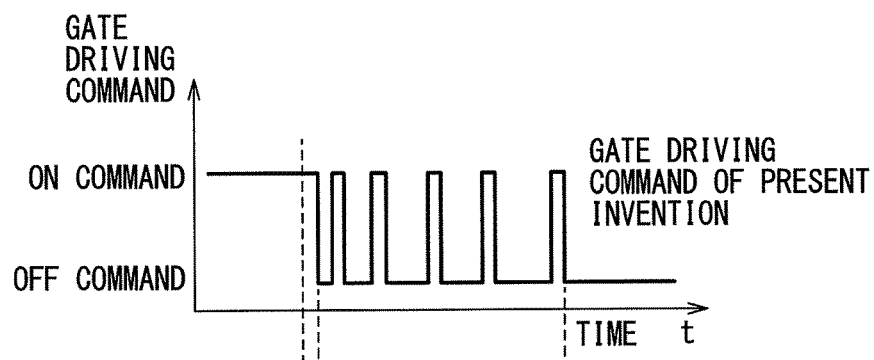
FIG. 2A is a drawing illustrating generation of a surge voltage at the time of overcurrent interruption in the motor driving apparatus according to the embodiment, in which a gate driving command is illustrated.
Figure 2B:
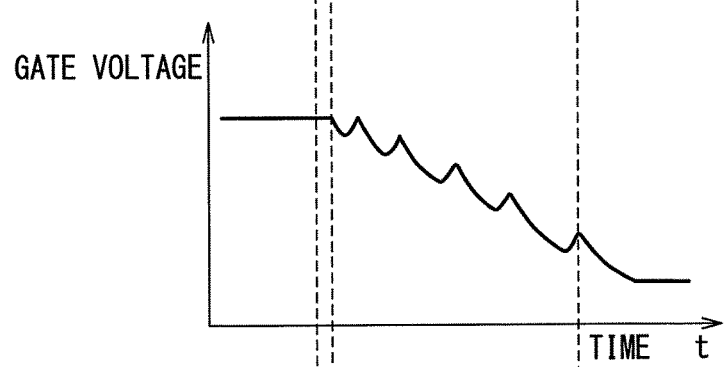
FIG. 2B is a drawing illustrating the generation of the surge voltage at the time of the overcurrent interruption in the motor driving apparatus according to the embodiment, in which a gate voltage is illustrated.
Figure 2C:
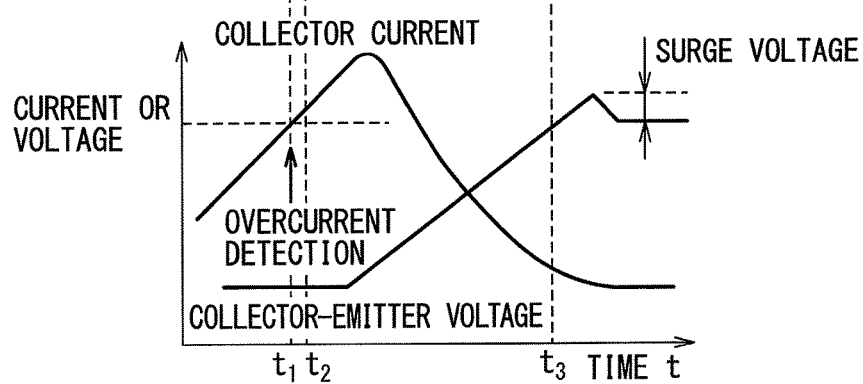
FIG. 2C is a drawing illustrating the generation of the surge voltage at the time of the overcurrent interruption in the motor driving apparatus according to the embodiment, in which a collector current, a collector-emitter voltage, and the surge voltage are illustrated.
Figure 3A:
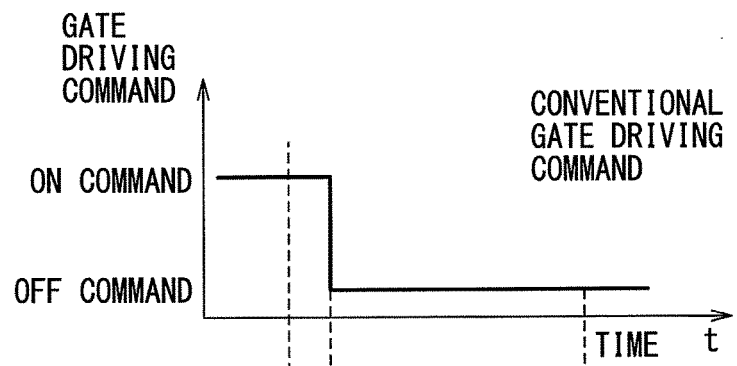
FIG. 3A is a drawing illustrating generation of a surge voltage at the time of conventional overcurrent interruption for comparison with the present invention, in which a gate driving command is illustrated.
Figure 3B:
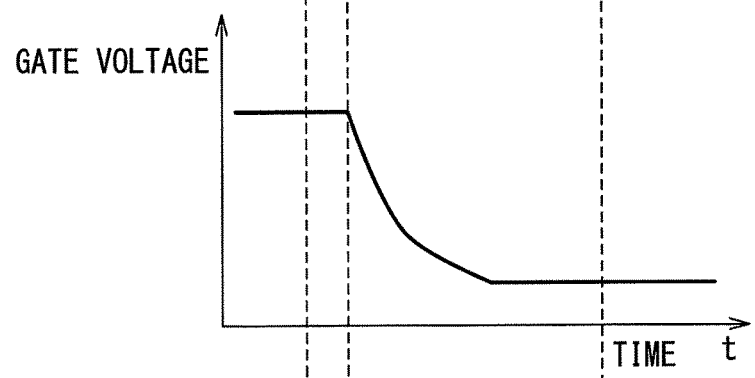
FIG. 3B is a drawing illustrating the generation of the surge voltage at the time of the conventional overcurrent interruption for comparison with the present invention, in which a gate voltage is illustrated.
Figure 3C:
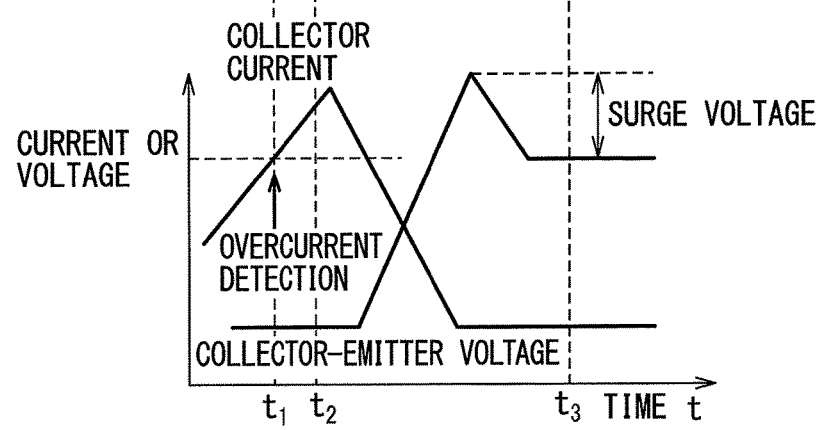
FIG. 3C is a drawing illustrating the generation of the surge voltage at the time of the conventional overcurrent interruption for comparison with the present invention, in which a collector current, a collector-emitter voltage, and the surge voltage are illustrated.
Figure 5:
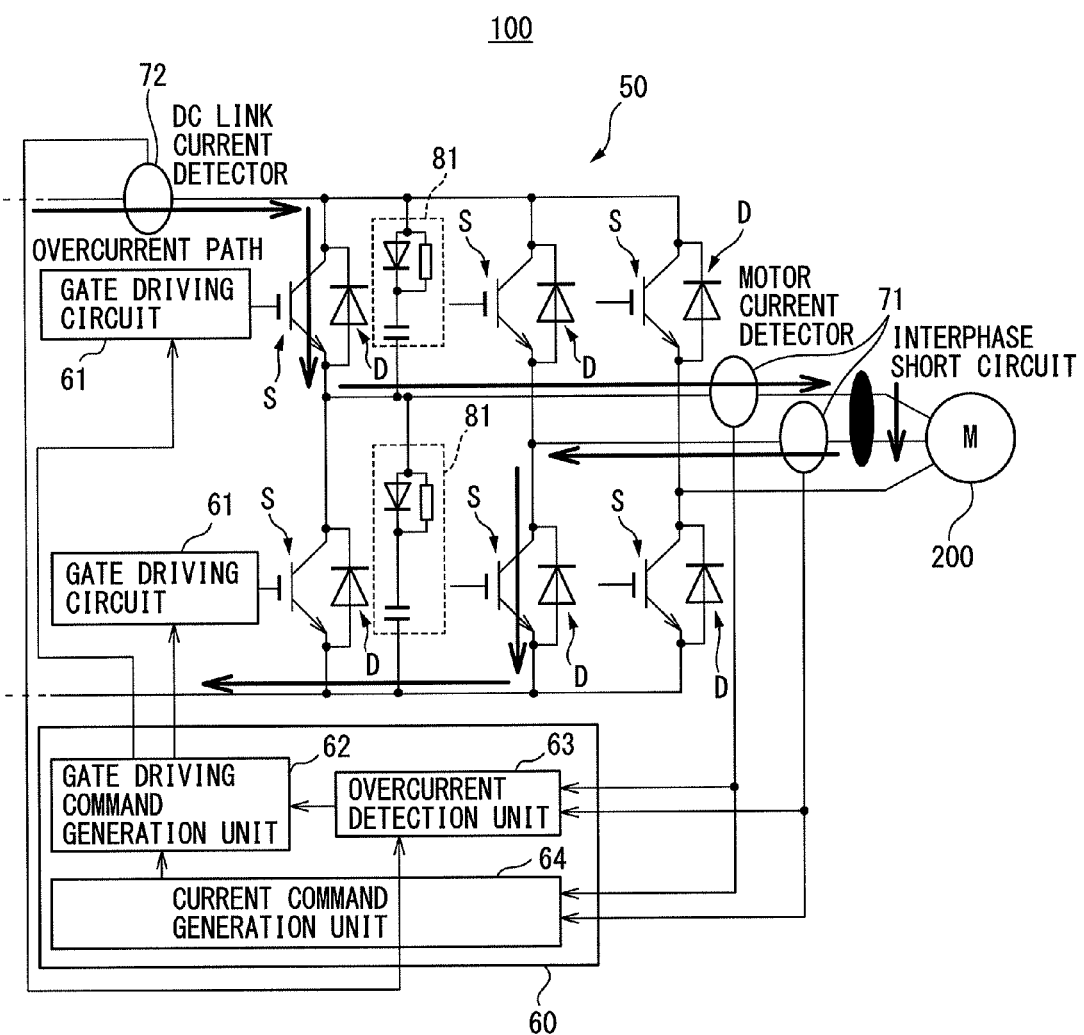
FIG. 5 is a circuit diagram illustrating a general motor driving apparatus which drives a three-phase AC motor using a DC power source.

As described above, when the overcurrent detection unit 14 detects the generation of the overcurrent, the gate driving command generation unit 13 alternately outputs the ON command and the OFF command while gradually increasing the ratio of the OFF command to the ON command and ultimately outputs only the OFF command. The operation is described in more detail below. FIG. 2A is a drawing illustrating generation of a surge voltage at the time of overcurrent interruption in the motor driving apparatus according to the embodiment, in which a gate driving command is illustrated. FIG. 2B is a drawing illustrating the generation of the surge voltage at the time of the overcurrent interruption in the motor driving apparatus according to the embodiment, in which a gate voltage is illustrated. FIG. 2C is a drawing illustrating the generation of the surge voltage at the time of the overcurrent interruption in the motor driving apparatus according to the embodiment, in which a collector current, a collector-emitter voltage, and the surge voltage are illustrated. FIG. 3A is a drawing illustrating the generation of the surge voltage at the time of the conventional overcurrent interruption for comparison with the present invention, in which the gate driving command is illustrated. FIG. 3B is a drawing illustrating the generation of the surge voltage at the time of the conventional overcurrent interruption for comparison with the present invention, in which the gate voltage is illustrated. FIG. 3C is a drawing illustrating the generation of the surge voltage at the time of the conventional overcurrent interruption for comparison with the present invention, in which the collector current, the collector-emitter voltage, and the surge voltage are illustrated.

First, the generation of the surge voltage at the time of the conventional overcurrent interruption is described with reference to FIG. 3A to FIG. 3C. Conventionally, when the overcurrent is generated at time $t_1$, the OFF command of the switching device is given to the gate driving circuit (time $t_2$) for interrupting the overcurrent as illustrated in FIG. 3A. The switching device is immediately turned off by giving the OFF command to the gate driving circuit, however, decrease in the gate voltage of the switching device is quick as illustrated in FIG. 3B, and thus a temporal change of the collector current becomes larger, and the surge voltage generated in the collector-emitter voltage becomes larger as illustrated in FIG. 3C.

In contrast, in the embodiment, when the overcurrent detection unit 14 detects the generation of the overcurrent at time $t_1$, the gate driving command generation unit 13 alternately outputs the ON command and the OFF command from time $t_2$ and after while gradually increasing the ratio of the OFF command to the ON command and ultimately outputs only the OFF command (time $t_3$) as illustrated in FIG. 2A. Since the ON command and the OFF command are alternately output while gradually increasing the ratio of the OFF command to the ON command, the gate voltage of the switching device is decreased more gradually than the conventional one as illustrated in the FIG. 2B, and a temporal change of the collector current becomes smaller, so that the surge voltage generated in the collector-emitter voltage can be suppressed more than the conventional one as illustrated in FIG. 2C.

FIG. 4 is a flowchart illustrating an operation flow of the motor driving apparatus according to the embodiment.

In step S101, the current command generation unit 15 generates the current command for controlling the speed, the torque, or the position of the rotor of the AC motor 200 using the detection value of the motor current detector 17, the input speed command, the operation program of the AC motor 200, the rotational speed of the AC motor 200, and the like. Accordingly, the AC motor 200 is driven.

In step S102, the overcurrent detection unit 14 determines whether the overcurrent is generated in the current flowing through the DC link of the motor driving unit 11 or the alternating current on the AC motor 200 side. When it is determined that the overcurrent is generated, the operation flow proceeds to step S103. The overcurrent detection unit 14 monitors the current detected by the DC link current detector 16 and the current detected by the motor current detector 17, and when detecting the generation of the overcurrent in either one of the DC link current and the motor current, notifies the gate driving command generation unit 13 of the generation of the overcurrent.

In step S103, the gate driving command generation unit 13 alternately outputs the ON command and the OFF command while gradually increasing the ratio of the OFF command to the ON command and ultimately outputs only the OFF command. Accordingly, the gate driving circuit 12 alternately outputs a voltage for turning on and a voltage for turning off to the gate of the switching device S while gradually increasing a ratio of an OFF time to an ON time and u outputs only the voltage for turning off. In response, the switching device S alternately repeats ON and OFF while gradually increasing the ratio of the OFF time to the ON time and ultimately becomes OFF. As a result, the gate voltage of the switching device S is decreased more gradually than the conventional one, and the temporal change of the collector current becomes smaller, so that the surge voltage generated in the collector-emitter voltage can be suppressed more than the conventional one.

According to the present invention, the surge voltage generated at the time of the overcurrent interruption can be easily suppressed without increasing the switching loss in the normal time and the components of the circuits, and the reliability of the motor driving apparatus can be improved without decreasing the efficiency or increasing the cost.

What is claimed is:

1. A motor driving apparatus for converting a DC voltage into AC voltage by a switching operation of a switching device and supplying alternating current to an AC motor, the motor driving apparatus-comprising:
   a motor driving unit configured to convert the DC voltage on a DC link side into the AC voltage when the switching device is turned on/off, and output the AC voltage to an AC motor side;
   a gate driving circuit configured to turn on/off the switching device of the motor driving unit in response to a received gate driving command;
   a gate driving command generation unit configured to output either one of an ON command and an OFF command as the received gate driving command to the gate driving circuit; and
   an overcurrent detection unit configured to detect generation of an overcurrent with respect to a current flowing through a DC link of the motor driving unit or an alternating current on the AC motor side, on a basis of a set overcurrent detection level, wherein, after the overcurrent detection unit detects the generation of the overcurrent on the basis of the set overcurrent detection level, the gate driving command generation unit generates repeated alternating outputs of the ON command and the OFF command while gradually increasing a ratio of the OFF command to the ON command and ultimately outputs only the OFF command.

2. The motor driving apparatus according to claim 1, further comprising a DC link current detector configured to detect the current flowing through the DC link, wherein the overcurrent detection unit monitors the current detected by the DC link current detector and, when detecting generation of the overcurrent, notifies the gate driving command generation unit of the generation of the overcurrent.

3. The motor driving apparatus according to claim 1, further comprising a motor current detector configured to detect the alternating current on the AC motor side, wherein the overcurrent detection unit monitors the alternating current detected by the motor current detector and, when detecting generation of the overcurrent, notifies the gate driving command generation unit of the generation of the overcurrent.

* * * * *